United States Patent [19]
Tsuboi et al.

[11] Patent Number: 5,825,914
[45] Date of Patent: Oct. 20, 1998

[54] COMPONENT DETECTION METHOD

[75] Inventors: Yasutaka Tsuboi, Yamanashi; Junichi Hada, Katano; Masamichi Morimoto, Moriguchi, all of Japan

[73] Assignee: Matsushita Electric Industrial Co., Ltd., Japan

[21] Appl. No.: 678,658

[22] Filed: Jul. 11, 1996

[30] Foreign Application Priority Data

Jul. 12, 1995 [JP] Japan .................................... 7-175798

[51] Int. Cl.$^6$ ...................................................... G06K 9/36
[52] U.S. Cl. ........................ 382/151; 382/168; 382/288; 348/95
[58] Field of Search ................................... 382/141, 143, 382/145, 146, 151, 152, 168–171, 174, 286, 288, 291, 293; 348/86, 87, 94, 95; 364/490, 441; 358/522; 250/560; 356/383, 384

[56] References Cited

U.S. PATENT DOCUMENTS

| | | | |
|---|---|---|---|
| 4,981,372 | 1/1991 | Morimoto et al. | 382/288 |
| 4,998,285 | 3/1991 | Suzuki et al. | 382/171 |
| 5,185,811 | 2/1993 | Beers et al. | 382/288 |
| 5,513,277 | 4/1996 | Huttenlocher | 382/171 |

*Primary Examiner*—Christopher S. Kelley
*Attorney, Agent, or Firm*—Parkhurst & Wendel

[57] ABSTRACT

It is intended to accurately detect the centerline or center of electronic component by relieving effects of brightness or darkness or the like caused by the shape or color of the component, irregularity on the surface or how illuminance is projected on the component through statistical processing. To this end, the present invention comprises a first step for determining edge points of opposing sides of said component, a second step for determining two-dimensional coordinate axes which are established to make a deflection angle of said component zero, a third step for projecting the center position of two edge points in total each of which is arbitrarily selected from each side to a coordinate axis of said two-dimensional coordinate axes orthogonal to said opposing sides, and creating a histogram on said coordinate axis by projecting and adding the positions of center repeatedly obtained onto said coordinate axis, and a fourth step for detecting the peak position of the histogram obtained from the result of processing of said third step, and determining a line passing through the peak position and parallel to said opposing sides as the centerline of component.

3 Claims, 14 Drawing Sheets

PRIOR ART

FIG.21

PRIOR ART

FIG.22

PRIOR ART

FIG.23

PRIOR ART

FIG.24

PRIOR ART

FIG.25

PRIOR ART

FIG.26

PRIOR ART

FIG.27

PRIOR ART

COMPONENT DETECTION METHOD

FIELD OF THE INVENTION

The present invention relates to a method for determining the centerline and/or center of a component using visual recognition technology to correct the mounting position of a component on an electronic component mounting machine.

BACKGROUND OF THE INVENTION

Conventionally, an electronic component mounting machine for mounting electcronic components on a board employs a component positioning method applying visual recognition technology. An example of conventional component detection methods is described by referring to the drawings.

Figure 20:
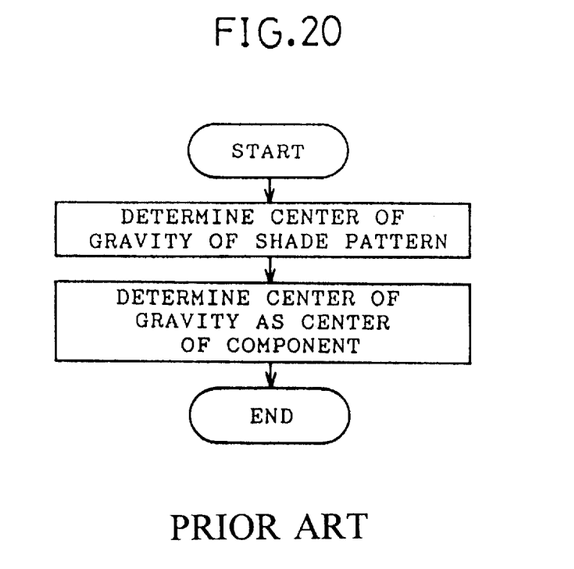
FIG. 20 is a flow chart illustrating an example of the conventional component detection methods.
Figure 21:
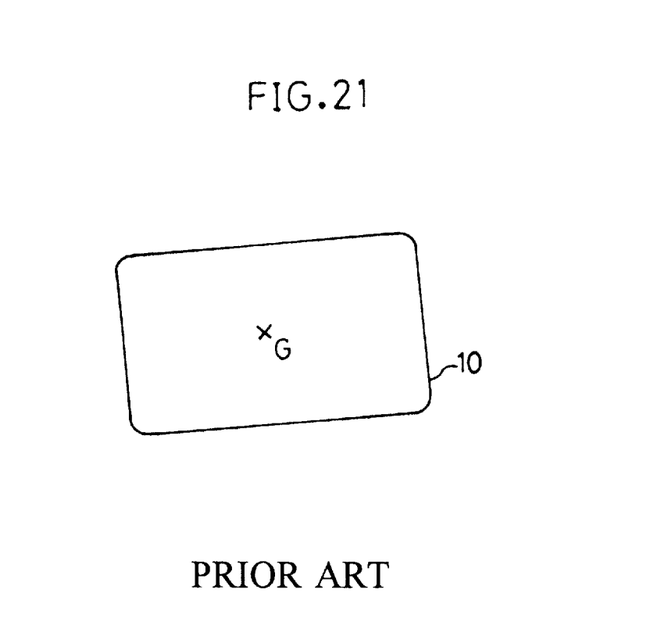
FIG. 21 is a diagram illustrating an example of the conventional component detection methods.
Figure 22:
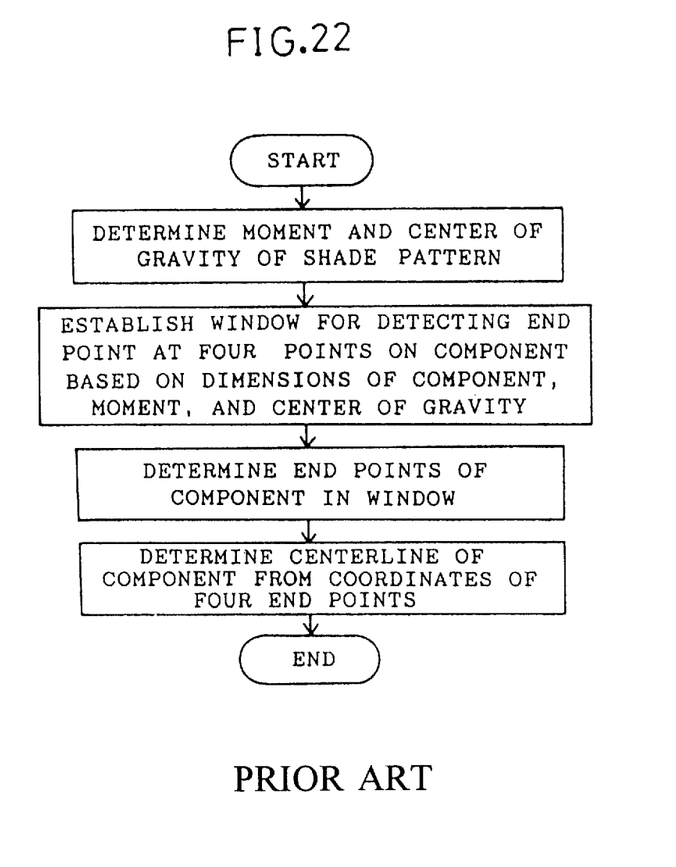
FIG. 22 is a flow chart illustrating another example of the conventional component detection methods.

FIGS. 20–25 show a conventional component detection method FIGS. 20 and 21 show as an example a method for finding the center of gravity G of a shade pattern of a component 10 imaged as a shade image, and determining it as the center of the component.

Figure 23:
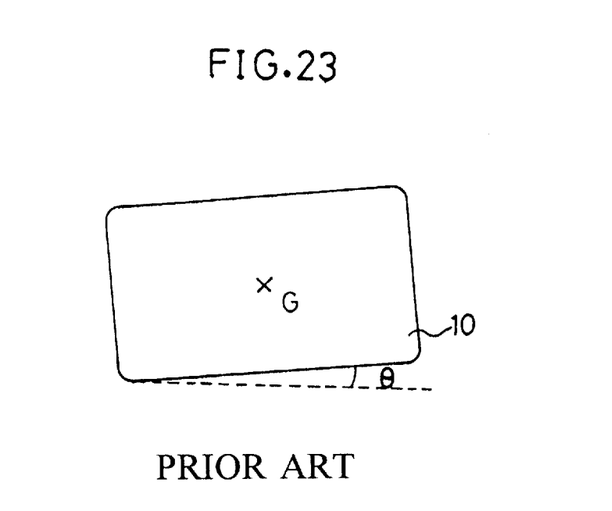
FIG. 23 is a diagram illustrating a part of operation of the component detection method of FIG. 22.
Figure 24:
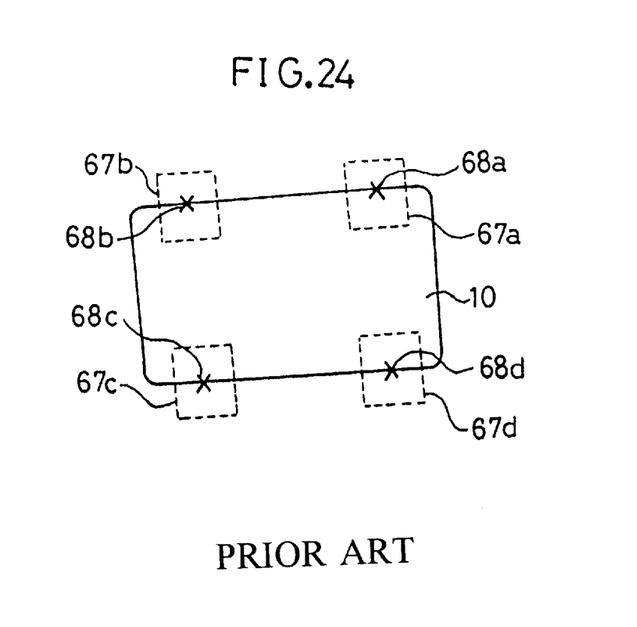
FIG. 24 is a diagram illustrating a part of operation of the component detection method of FIG. 22.
Figure 25:
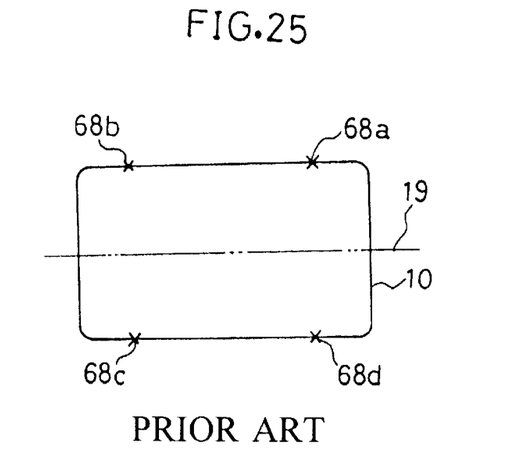
FIG. 25 is a diagram illustrating a part of operation of the component detection method of FIG. 22.

FIGS. 22–25 show another example of the prior art. This example first finds the moment and the center of gravity G of a shade pattern of a component 10 imaged as a shade image (FIG. 23). In FIG. 23, θ is a deflection angle of the component 10 which is found by an ellipse approximation method shown in FIG. 27. Then, end point detection windows 67a, 67b, 67c, and 67d are established at four points on the component 10 based on the size, the moment, and the center of gravity G, and end points of the component 68a, 68b, 68c, and 68d in each window are determined (FIG. 24). Subsequently, the centerline of component 19 is determined from four end points of the component (FIG. 25).

Figure 26:
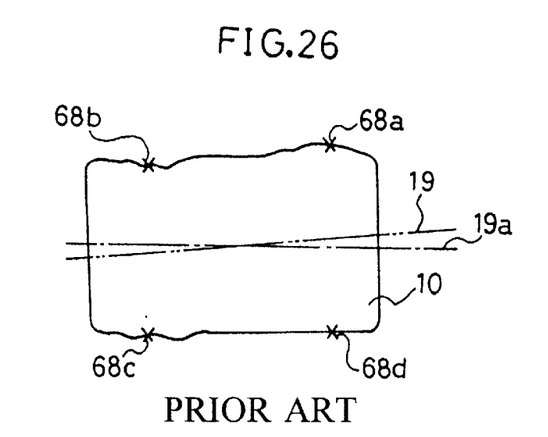
FIG. 26 is a diagram illustrating how recognition is performed in the conventional component detection method.

However, the methods as described above are easily affected by the shape and color of the component, irregularity on the surface of component, or brightness or darkness caused by how illuminance is projected on the component. Thus, there is a problem that there arises offset between the actual centerline of the component and that obtained through recognition, so that accuracy is deteriorated. FIG. 26 shows the situation where the outline of an imaged component 10 is distorted by the above effects. If the end points of the component 68a–68d are determined by establishing the conventional windows 67a–67d, they are positioned as shown in FIG. 26. The centerline of component 19 obtained on the basis of above result would be offset from the true centerline of component 19a.

In view of the above problems, the present invention is intended to provide a method for detecting a centerline of component or the like for an electronic component mounting machine which is less affected by the state of components or the environment.

DISCLOSURE OF THE INVENTION

To attain the above object, the present invention provides a component, detection method for determining a centerline of an imaged component comprising a first step of for determining edge points on opposing sides of the component, a second step of determining two-dimensional coordinate axes which are established to make a deflection angle of the component zero, a third step of projecting the center position of two edge points arbitrarily selected from each side to the coordinate axis orthogonal to the opposing side in the two-dimensional coordinate axes, and creating a histogram on the coordinate axis by projecting and adding the positions of center repeatedly obtained onto the coordinate axis, and a fourth step of detecting the peak position of the histogram obtained from the result of processing of the third step, and determining a line passing through the peak position and parallel to the opposing sides as the centerline of the component.

The present invention applies the method for determining the centerline to find the centerline for two sets of opposing sides, and to determine the intersection of them as the center of the component.

The third step or the above invention for creating the histogram adds the intensity of the edge point to the histogram as weight.

The third step of the above invention for creating the histogram adds weight determined from a weight function produced from tale dimensions of component to the histogram.

According to the present invention, the centerline or center of electronic component can be accurately detected by relieving effects of brightness or darkness or the like caused by the shape or color of the component, irregularity on the surface or how illuminance is projected on the component through statistical processing with a histogram.

In addition, effects by noise or the like can be reduced by creating a histogram with weight taking intensity of an edge, or the size or shape of the component into account.

DESCRIPTION OF THE EMBODIMENTS

Now, embodiments of the present invention will be explained by referring to the drawings.

Figure 1:
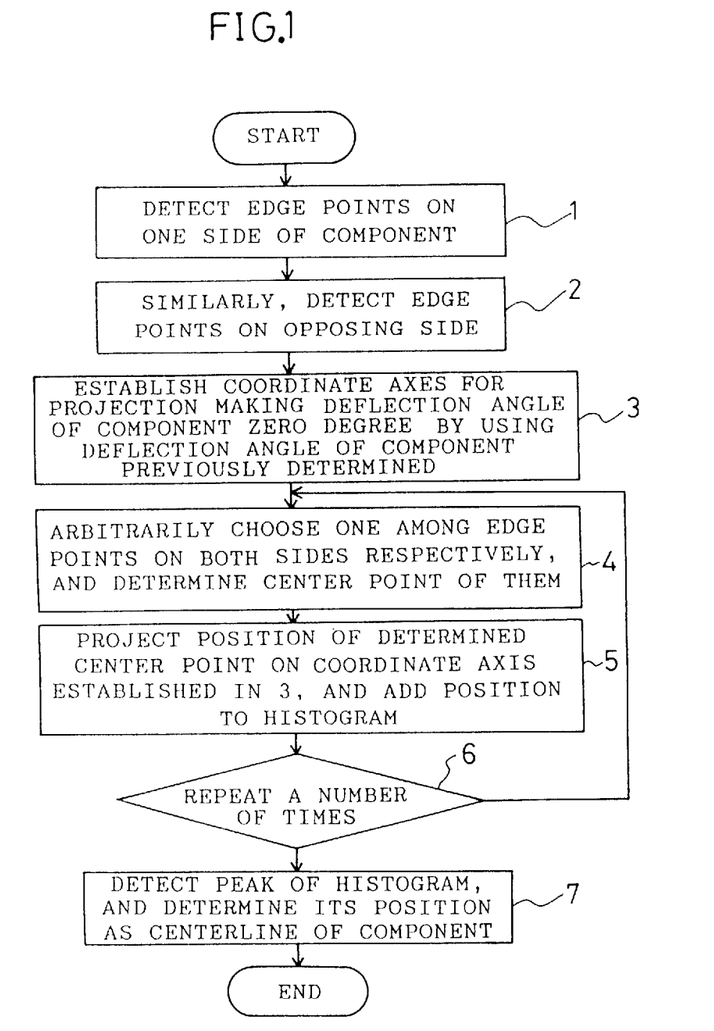
FIG. 1 is a flow chart generally illustrating the component detection method according to an embodiment of the present invention.

FIG. 1 is a flow chart generally illustrating the component detection method according to an embodiment of the present invention, detail of steps 1–7 of which is shown in FIGS. 2–6. FIG. 7 shows an electronic component mounting machine to which the present invention is applied.

In the electronic component mounting machine shown in FIG. 7, mounting nozzles for electronic components or the like 55 are located around the periphery of a cylinder 56 with regular spacing. Each nozzle is intermittently rotated around the axis of the cylinder 56 to move to a respective operating position, and can be rotated around its own axis.

Reference numeral 57 indicates a data processing system for processing and (controlling data for the component mounting machine. This system contains an operation control program for the entire machine, various programs including a control program the flow of which is shown in FIG. 1, and base data required for mounting of the electronic components including mounting sequences of the electronic components, a mounting position (center), orientation (orientation of centerline), and required accuracy for each electronic component.

In mounting, the mounting nozzle 55 sticks and holds at a position 55a a component 53 from a component supply 54 for electronic components or the like, and provides rough prerotation for the component required for mounting at a position 55b. Subsequently, at a position 55c, a CCD imaging camera 51 and an image data processor (recognition board) 50 measure a suction/holding position and attitude for the nozzle 55. The recognition hoard 50 contains a program for processing the image out-putt from the imaging camera 51 to determine the center and the centerline of the component. The nozzle is rotated for correction at a position 55d by a control signal from the data processing system 57 based on the relationship between the result of measurement, and data for the position and attitude of the component 53 required for mounting. Once the orientation of the component 53 is corrected for a proper orientation, the component 53 is mounted at a predetermined position on a printed circuit board 52 at a position 55e.

Now, description is given a method for determining the centerline of the component 10 from an image of component 10 (hereinafter simply called the "component") of the component 53 which is imaged by the CCD imaging camera 51 and image processed to a two-dimensional shade image.

Figure 2:
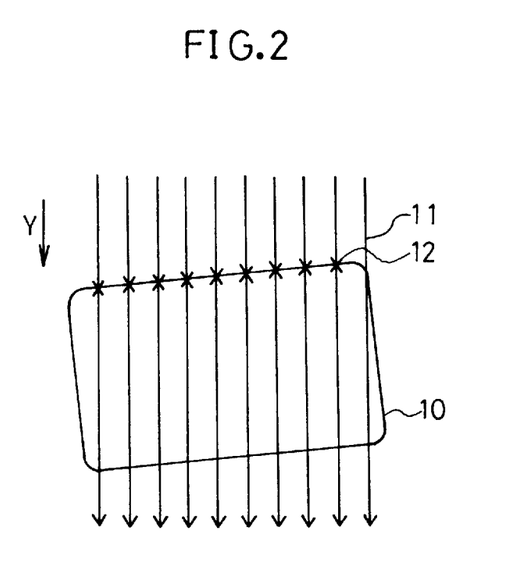
FIG. 2 is a diagram illustrating step 1 of FIG. 1.

First, FIG. 2 shows a step for detecting edge points on a side of the component 10 (step 1 of FIG. 1). In the figure, reference numeral 10 indicates the component, 11 scanning lines for detecting edge points, 12 detected edge points. The component 10 is scanned by the scanning lines 11 downward in the figure, and a number of edge points 12 are detected by the respective scanning lines.

Figure 3:
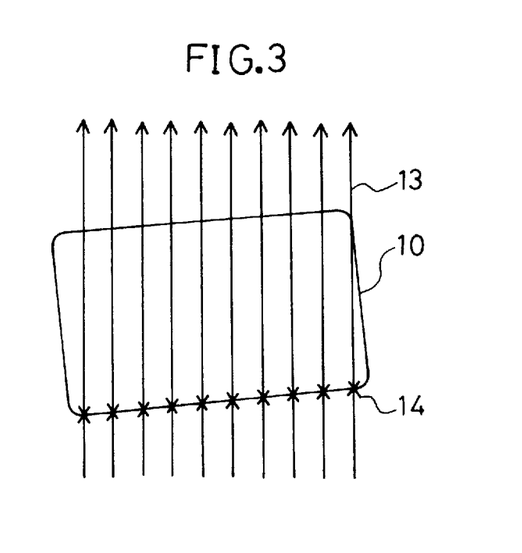
FIG. 3 is a diagram illustrating step 2 of FIG. 1.

Then, as shown in FIG. 3, the component 10 is scanned by scanning lines 13 in the opposite direction to those in FIG. 2, and a number of edge points 14 are detected on the side opposite to the previous side by the respective scanning lines step 2)

Figure 27:
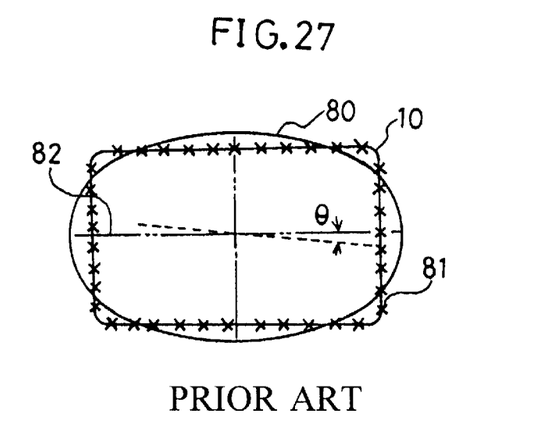
FIG. 27 is a diagram illustrating an ellipse approximation method in which boundary points of a component are approximated by an ellipse, and the deflection angle of its major axis is determined as that of the component.

In the next step 3, coordinate axes x, y making a newly determined deflection angle θ of the component zero degree are established by utilizing the deflection angle θ previously determined by the ellipse approximation method. The ellipse approximation method is a method for finding an ellipse 80 best fit to a set of boundary points of the component 10 through arithmetic operation, and determining its major axis as the deflection angle of the component 10. In other words, the ellipse approximation method is a method for determining inclination found from the following equations for a set of coordinate values of N boundary points (X(1), Y(1)), (X(2), Y(2)), . . . (X (N), Y(N)).

$$\theta = \frac{1}{2} \tan^{-1} \frac{S1}{S2}$$

$$S1 = 2 * (N * Sxy - Sx * Sy)$$

$$S2 = (N * Sxx - Sx^2) - (N * Syy - Sy^2)$$

$$Sx = \sum_{i=1}^{N} X(i)$$

$$Sy = \sum_{i=1}^{N} Y(i)$$

$$Sxx = \sum_{i=1}^{N} X(i)^2$$

$$Syy = \sum_{i=1}^{N} Y(i)^2$$

$$Sxy = \sum_{i=1}^{N} (X(i) * Y(i))$$

Figure 4:
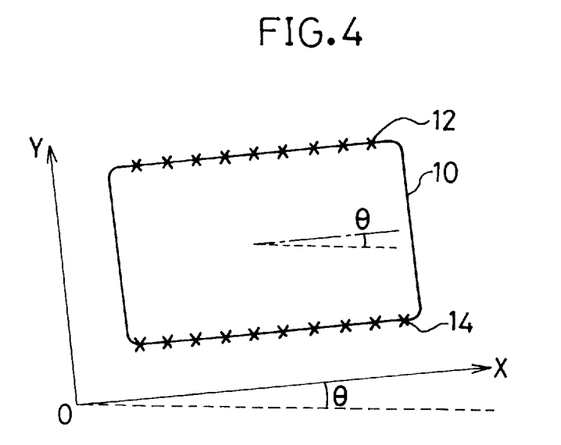
FIG. 4 is a diagram illustrating step 3 of FIG. 1.

By using the deflection angle θ instead of establishing the coordinate axes x, y, the coordinate axes for the edge points 12 and 14 for both sides shown FIG. 4 may be rotated so that they provide a deflection angle of zero degree through the linear transformation.

Figure 5:
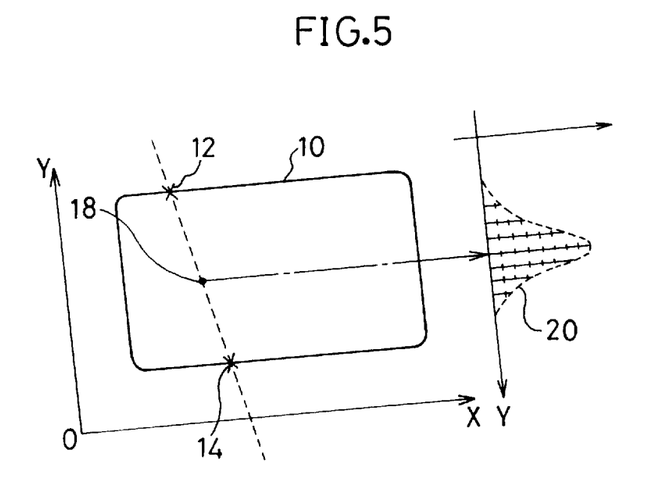
FIG. 5 is a diagram illustrating steps 4 and 5 of FIG. 1.

The next step 4 arbitrarily selects two points from the edge points 12 arid 14 on both sides, respectively, as shown in FIG. 5, and determines a center point, 18 of these two points.

Step 5 projects the position of determined center point 18 on the axis of the coordinate axes x, y determined in step 3 which is orthogonal to both sides, and adds that position to a histogram.

A histogram 20 is created on the y axis by adding the positions of center points 18 on y coordinates by repeating the operations of steps 4 and 5 many times (step 6).

Figure 6:
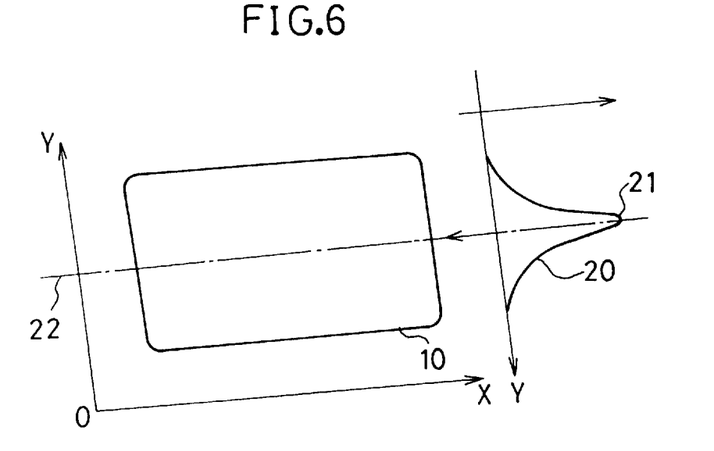
FIG. 6 is a diagram illustrating step 7 of FIG. 1.
Figure 7:
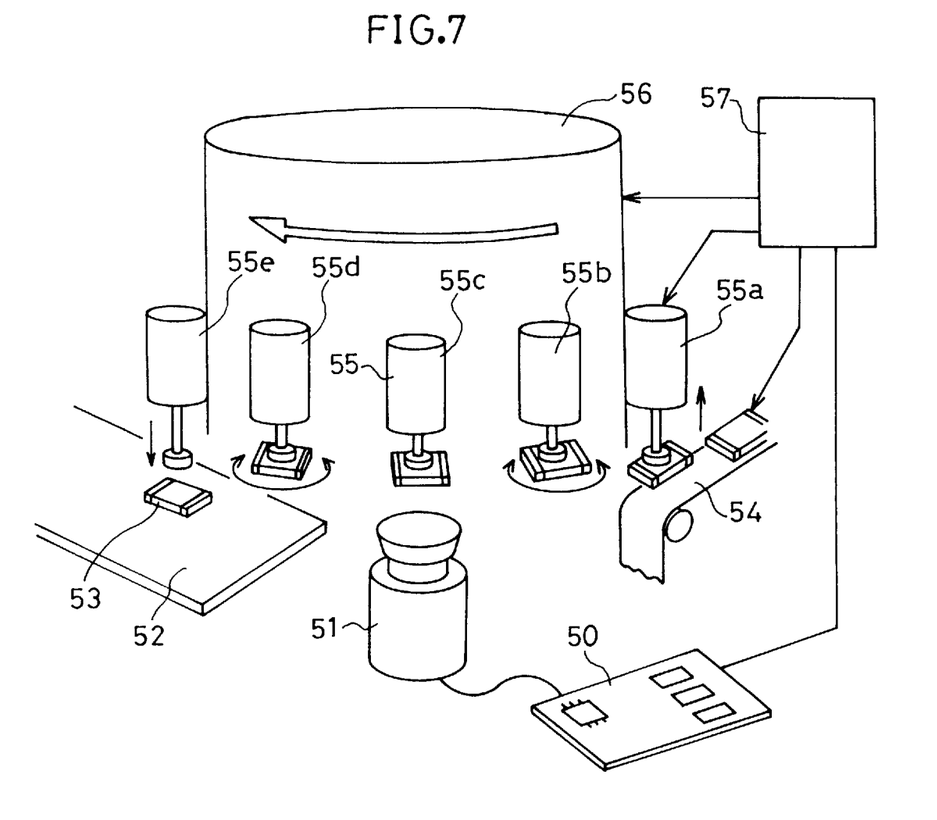
FIG. 7 is a schematic view showing a component mounting machine to which the component detection method of the present invention is applied.

Step 7 detects a peak 21 of the histogram 20 as shown in FIG. 6, and determines a straight line which is an extension of that position 21 along the x axis as the centerline 22 of the component 10.

Figure 8:
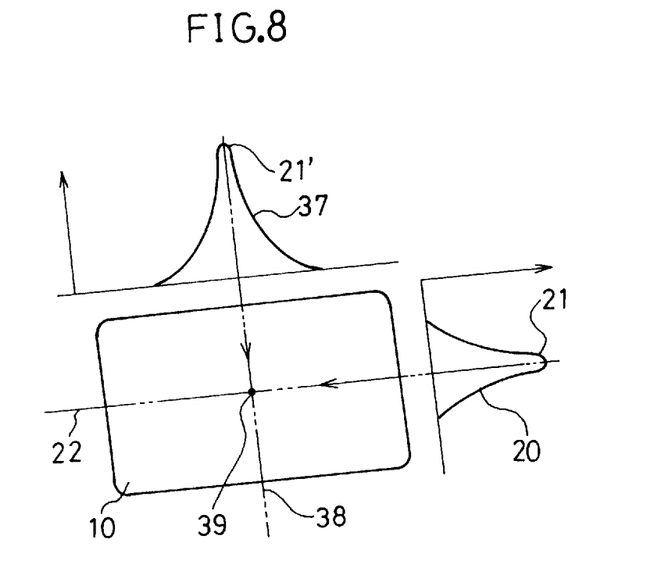
FIG. 8 is a diagram illustrating a method for determining the center of component in the present invention.

FIG. 8 shows a method for determining the center 39 of the component 10 by applying the above-mentioned embodiment. That is, the process shown in FIG. 1 is performed for four sides of the component 10 to create the histograms 20 and 37, determine the centerline 22 and 38 of the respective peak positions 21 and 21', and determine the intersection 39 of them as the center of the component 10.

FIGS. 9–12 show a component detection method according to another embodiment of the present invention. In this embodiment, a histogram is created by taking the intensity of edge into account. In creating the histogram, the intensity of edge is added to the histogram as weight. Thus, this embodiment differs from that shown in FIGS. 1–6 in this point. In an approach not taking the intensity of edge into account, there may be a case where the position of a component is not properly detected for an image with much noise due to interference by such noise. Then, when the intensity of edge is taken into account, difference between noise and the boundary of component can be enhanced so that the position of component can be detected in a manner insensitive to noise. It is because the intensity of edge at the boundary of component is stronger than the magnitude of noise.

Figure 9:
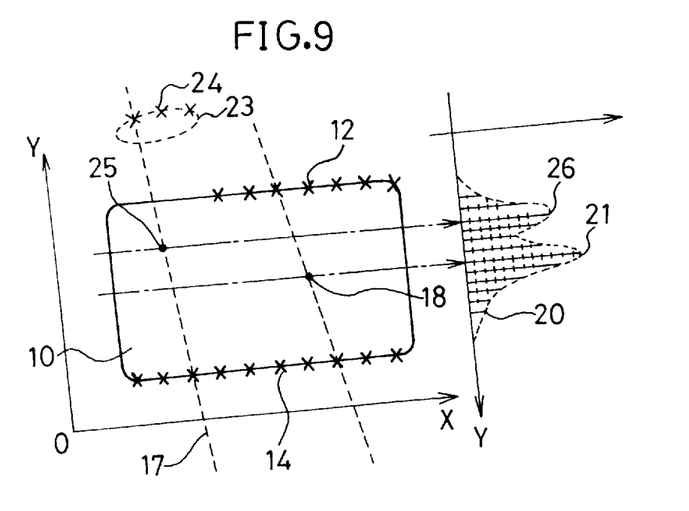
FIG. 9 is a diagram illustrating the effect of noise in the component detection method of the present invention.

FIG. 9 shows influence of noise 23 on the detection of component when it exists. If there exists noise 23 close to the component 10 which is imaged by the imaging camera 51 and image processed to a two-dimensional shade image, edge points 24 are detected at the position of noise 23. Then, if the intensity of edge is not taken into account, an improper peak 26 is generated in the histogram 20. Sometimes, it may be erroneously recognized as the position of centerline of component 10.

Figure 10:
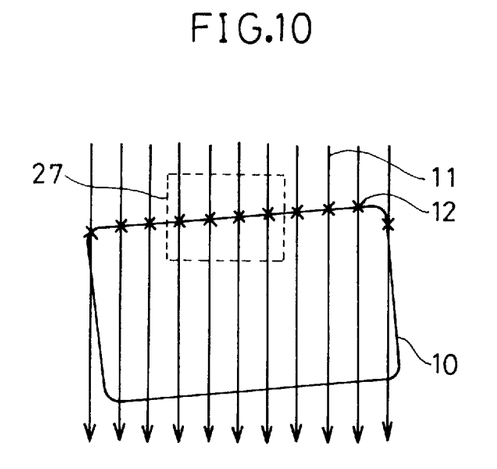
FIG. 10 is a diagram illustrating intensity of an edge in the component detection method of the present invention.
Figure 11:
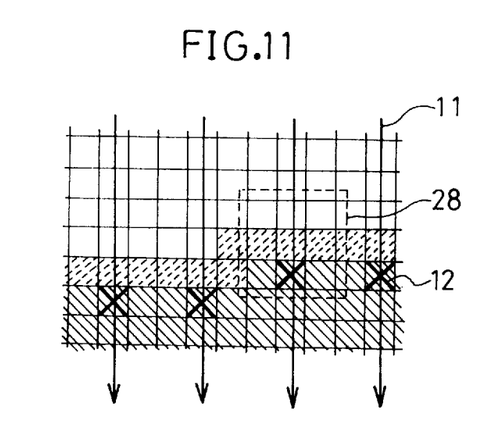
FIG. 11 is a diagram illustrating intensity of an edge in the component detection method of the present invention.
Figure 12:
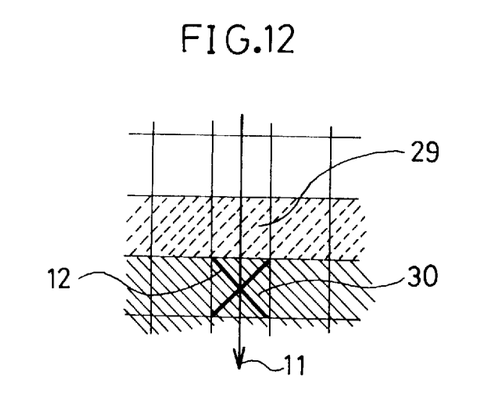
FIG. 12 is a diagram illustrating intensity of an edge in the component detection method of the present invention.

FIG. 10 shows a component 10 to be recognized, scanning lines 11 for detecting edge points, and edge points 12. FIG. 11 is an enlarged view of a region surrounded by a broken line frame 27 in FIG. 10. An enlarged view of a region surrounded by a broken line frame 28 of FIG. 11 is FIG. 12. In FIG. 12, reference numeral 30 indicates a pixel determined as an edge point by the scanning line 11, while reference numeral 29 is an adjacent pixel scanned immediately before the pixel 30.

The intensity of edge may be expressed by using differential obtained from the difference between intensity of the pixel 30 and that of the pixel 29 for the size of one pixel, but may be expressed by a value using other approaches.

A histogram with a sharp peak at the center of component can be created by adding the intensity of edge obtained by the above to the histogram, thereby the centerline of component being more accurately detected.

Figure 13:
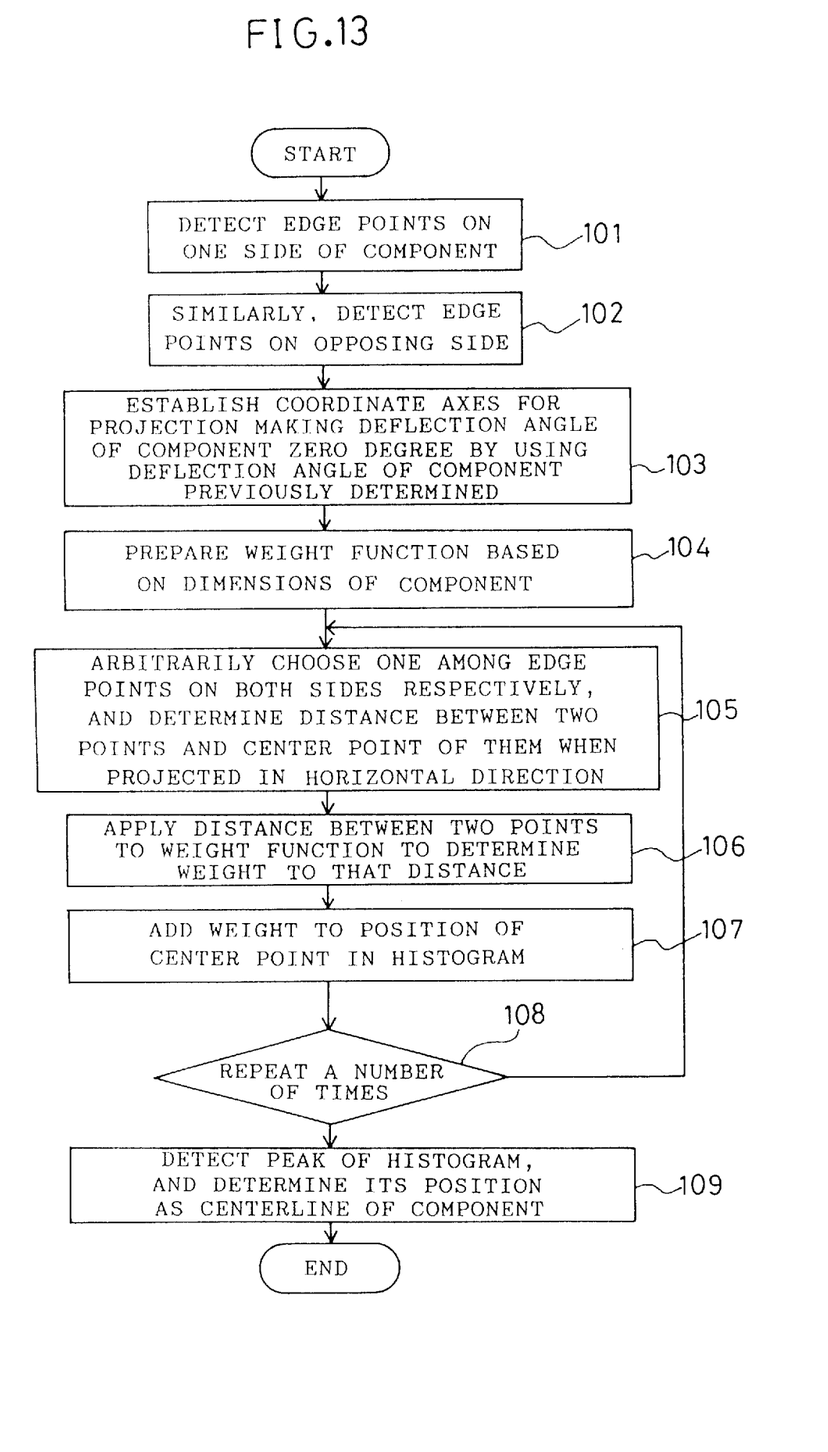
FIG. 13 is a flow chart generally illustrating still another embodiment of the component detection method according to the present invention.

FIG. 13 is a flow chart generally illustrating still another embodiment, of the component detection method.

In FIG. 13, steps 101–109 indicate a procedure for implementation, respectively. In addition, FIGS. 14–19 show each procedure as a diagram. A difference from the arrangement in FIG. 1 lies in that weight v derived from a weight function taking the dimensions of component into account is used in creating the histogram. The operation of this embodiment is described by referring to FIGS. 13–19.

Figure 14:
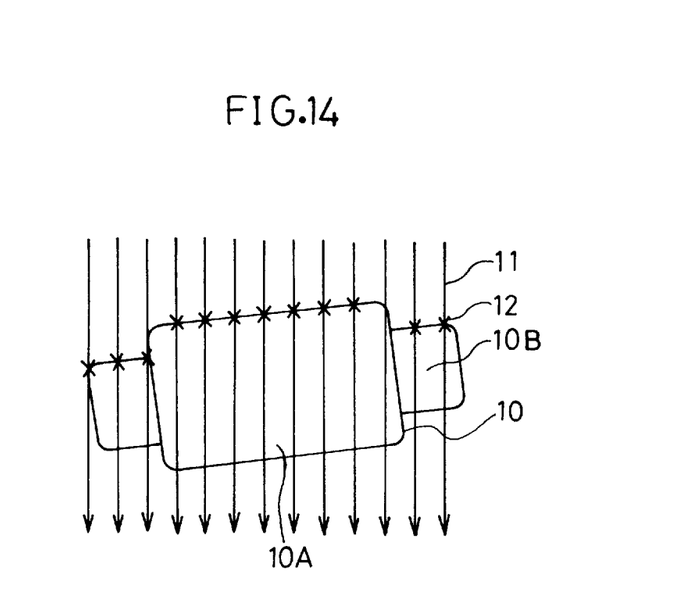
FIG. 14 is a diagram illustrating step 101 of FIG. 13.
Figure 15:
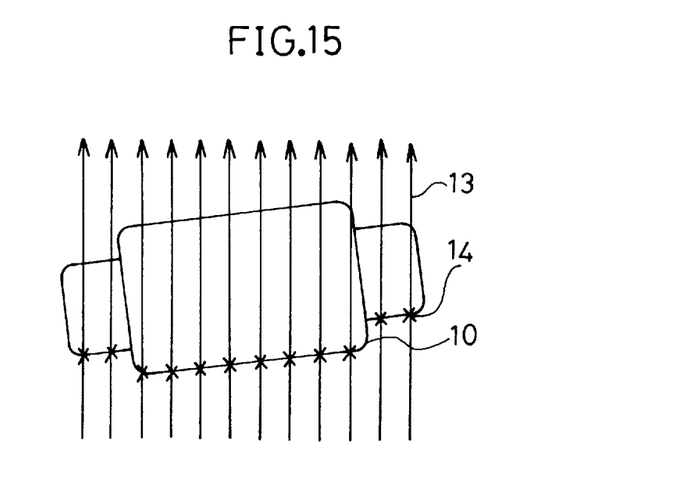
FIG. 15 is a diagram illustrating step 102 of FIG. 13.
Figure 16:
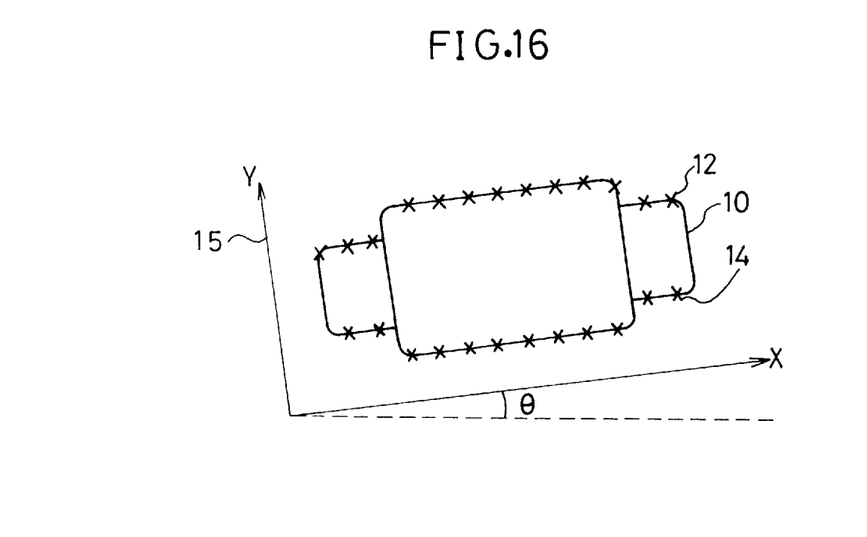
FIG. 16 is a diagram illustrating step 103 of FIG. 13.

As the component 10 to be measured, an example consisting of a body 10A and legs 10B is represented as shown in FIG. 14 and later. First, as shown in FIG. 14, the component 10 is scanned by scanning lines 11 downward in the figure to detect edge sections 12 on the upper side for the respective scanning lines (step 101 of FIG. 13). Similarly, as shown in FIG. 15, the opposing lower side is scanned by upward scanning lines 13 to detect edge sections 14 for respective scanning lines (step 102). Then, as shown in FIG. 16, coordinate axes x, y for projection making the deflection angle of component zero are established by using a deflection angle θ of component previously determined (step 103).

Figure 17:
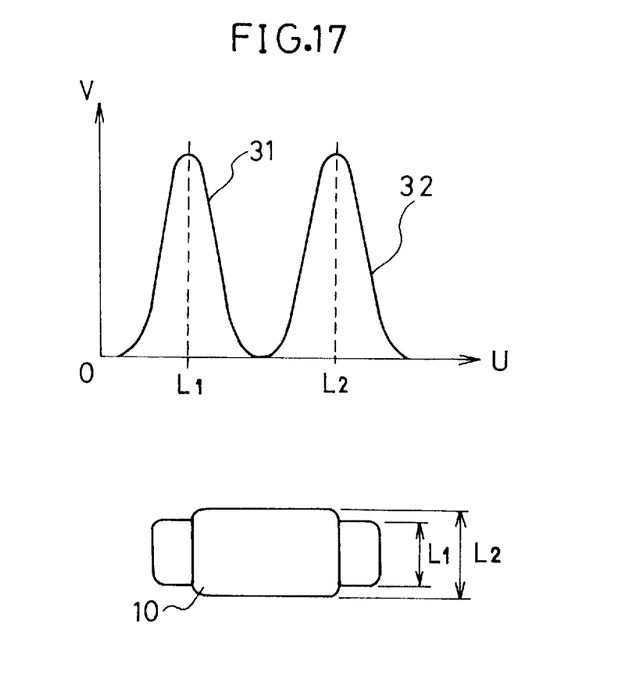
FIG. 17 is a diagram illustrating step 104 of FIG. 13.

Then, as shown in FIG. 17, a weight function (equation (1)) is prepared from the dimensions of component (step 104).

$$V = \underset{i=1}{\overset{j}{\text{Max}}} \left\{ E\left[ \frac{u - Li}{\sigma} \right] \right\} \tag{1}$$

The above equation (1) is a weight function indicating weight to be added to a histogram at a distance between edge points u when designation of component dimensions exists j (L1, L2, . . . Lj).

In the above equation,

V is a value of weight function;

j is number of designations of component dimensions;
   Max is a function for extracting the maximum value in arguments;

E is a Gaussian function $$\left[ E(x) = \exp\left( -\frac{x^2}{2} \right) \right];$$

u is distance between edge points;

Li is the dimensions of component; and

σ is a standard deviation of the Gaussian function E, and usually provides dispersion of the dimensions of component .

The above equation may be developed as follows:

$$V(u) = \text{Max}\left( E\left( \frac{u - L1}{\sigma} \right), E\left( \frac{u - L2}{\sigma} \right), \ldots, E\left( \frac{u - Lj}{\sigma} \right) \right)$$

In the developed equation above, V(u) represents a value of the weight function when the distance between edge points is u. Reference numeral 31 in FIG. 17 indicates the weight function for the dimensions of component L1, while reference numeral 32 indicates the weight function for the dimensions of component L2. Intensity of two edge points I (A), (B) may be applied together to the weight function of equation (1) (equation (2)).

I (A) is the intensity of edge at the edge point A on the upper side, and usually provides the difference of intensity in the vertical direction (absolute value) at the edge point A.

I (B) is the intensity of edge at the edge point B on the lower side, and usually provides the difference of intensity in the vertical direction (absolute value) at the edge point B.

$$V = \underset{i=1}{\overset{j}{\text{Max}}} \left\{ E\left[ \frac{u - Li}{\sigma} \right] \right\} I(A) \cdot I(B) \tag{2}$$

The above equation may be developed as follows:

$$V(u) = \text{Max}\left( E\left( \frac{u - L1}{\sigma} \right), E\left( \frac{u - L2}{\sigma} \right) \ldots E\left( \frac{u - Lj}{\sigma} \right) \right) \cdot I(A) \cdot I(B)$$

In addition, $$\underset{i=1}{\overset{j}{\text{Max}}}$$

in the above (1) and (2) may be replaced to $$\sum_{i=1}^{j}.$$

If Σ is used, the following can be obtained.

$$V(u) = E\left(\frac{u-L1}{\sigma}\right) + E\left(\frac{u-L2}{\sigma}\right) + \ldots + E\left(\frac{u-Lj}{\sigma}\right)$$

Figure 18:
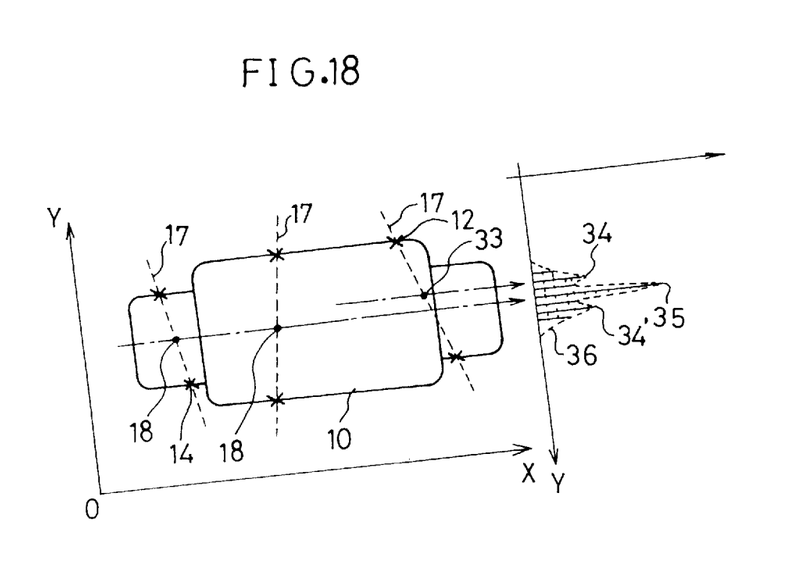
FIG. 18 is a diagram illustrating steps 105–107 of FIG. 13.

Then, each one point is arbitrarily selected from the edge points on both sides determined on steps 101 and 102 to determine the (distance between two points and the position of center point when projected in the horizontal direction (X coordinate axis direction) (step 105). As shown in FIG. 18, a peak 35 is formed by projecting center points 18 between edge points on respective opposing sides of the body 10A and the legs 10B. In addition, relatively small peaks 34, 34' are formed on each side of the peak 35 by projecting center points 33 between the edge point of the body 10A and those of the legs 10B.

Figure 19:
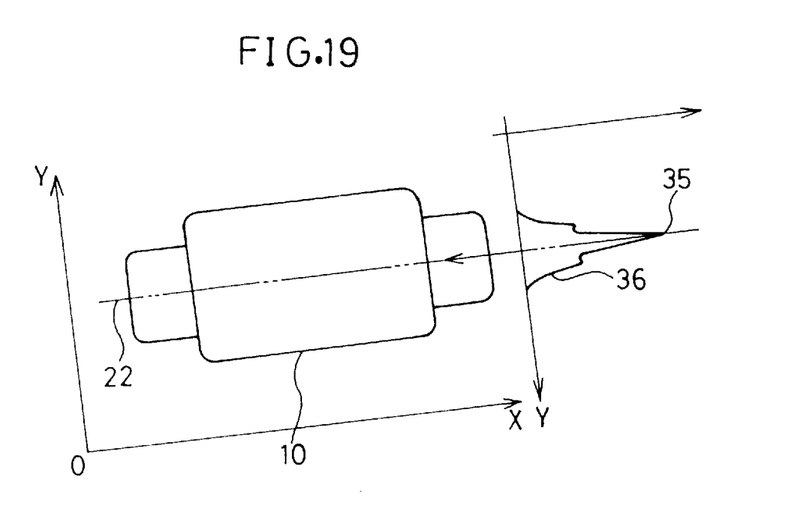
FIG. 19 is a diagram illustrating step 109 of FIG. 13.

Then, the distance between two points is applied to the weight function to determine the weight at that distance (step 106), and the weight is added to the position of center point in the position histogram (step 107). The process of steps 105–107 is repeated a number of times (step 108). Then, as shown in FIG. 19, a peak 35 for the entire histogram 36 is determined, and a straight line which is its extension parallel to X axis is determined as the centerline 22 of the component 10 (step 109).

As described above, when the histogram is created by using the weight function according to the above equation, the histogram of the position of center point 18 between two edge points with the distance closest to the dimensions of component (35 in FIG. 18) is enhanced when compared to the histograms of the position of center points 33 which may be erroneously detected because of combination of edge points (34, 34' in FIG. 18).

The centerline 22 of the component 10 is determined by detecting the highest peak 35 in the histogram 36 thus obtained. It is shown in FIG. 19. In addition, when such weight using the dimensions of component is employed, it is possible to eliminate noise inside and outside the component as in FIG. 9.

We claim:

1. A component detection method for determining the center of said component, comprising the steps of:
   (a) determining edge points of opposing sides of said component,
   (b) determining two-dimensional coordinate axes which are established to make a deflection angle of said component zero,
   (c) protecting the center position of two edge points arbitrarily selected from each side to the coordinate axis orthogonal to the opposing side in the two-dimensional coordinate axes, and creating a histogram on said coordinate axis by protecting and adding the positions of center repeatedly obtained onto said coordinate axis,
   (d) detecting the peak position of the histogram obtained from the result of processing of said step (c), and determining a line passing through the peak position and parallel to said opposing sides as the centerline of said component,
   (e) repeating steps (a), (b), (c) and (d) for another pair of opposing sides of said component and determining another line passing through a peak position and parallel to said other opposing sides as another centerline of said component, and
   (f) determining the center of said component as an intersection of the centerlines.

2. A component detection method for determining a centerline of an imaged component, comprising the steps of:
   (a) determining edge points of opposing sides of said component,
   (b) determining two-dimensional coordinate axes which are established to make a deflection angle of said component zero,
   (c) projecting the center position of two edge points arbitrarily selected from each side to the coordinate axis orthogonal to the opposing side in the two-dimensional coordinate axes, and creating a histogram on said coordinate axis by projecting and adding the positions of center repeatedly obtained onto said coordinate axis, said step of creating a histogram including adding the intensity of edge point to the histogram as weight, and
   (d) detecting the peak position of the histogram obtained from the result of processing of said step (c), and determining a line passing through the peak position and parallel to said opposing sides as the centerline of said component.

3. A component detection method for determining a centerline of an imaged component, comprising the steps of:
   (a) determining edge points of opposing sides of said component,
   (b) determining two-dimensional coordinate axes which are established to make a deflection angle of said component zero,
   (c) projecting the center position of two edge points arbitrarily selected from each side to the coordinate axis orthogonal to the opposing side in the two-dimensional coordinate axes, and creating a histogram on said coordinate axis by projecting and adding the positions of center repeatedly obtained onto said coordinate axis, said step of creating the histogram including adding weight found from a weight function produced from the dimensions of said component to the histogram, and
   (d) detecting the peak position of the histogram obtained from the result of processing of said step (c), and determining a line passing through the peak position and parallel to said opposing sides as the centerline of said component.

* * * * *